E. G. BALCH.
AUTOMOBILE SIGNAL.
APPLICATION FILED NOV. 28, 1917.
1,314,730.
Patented Sept. 2, 1919.
3 SHEETS—SHEET 1.
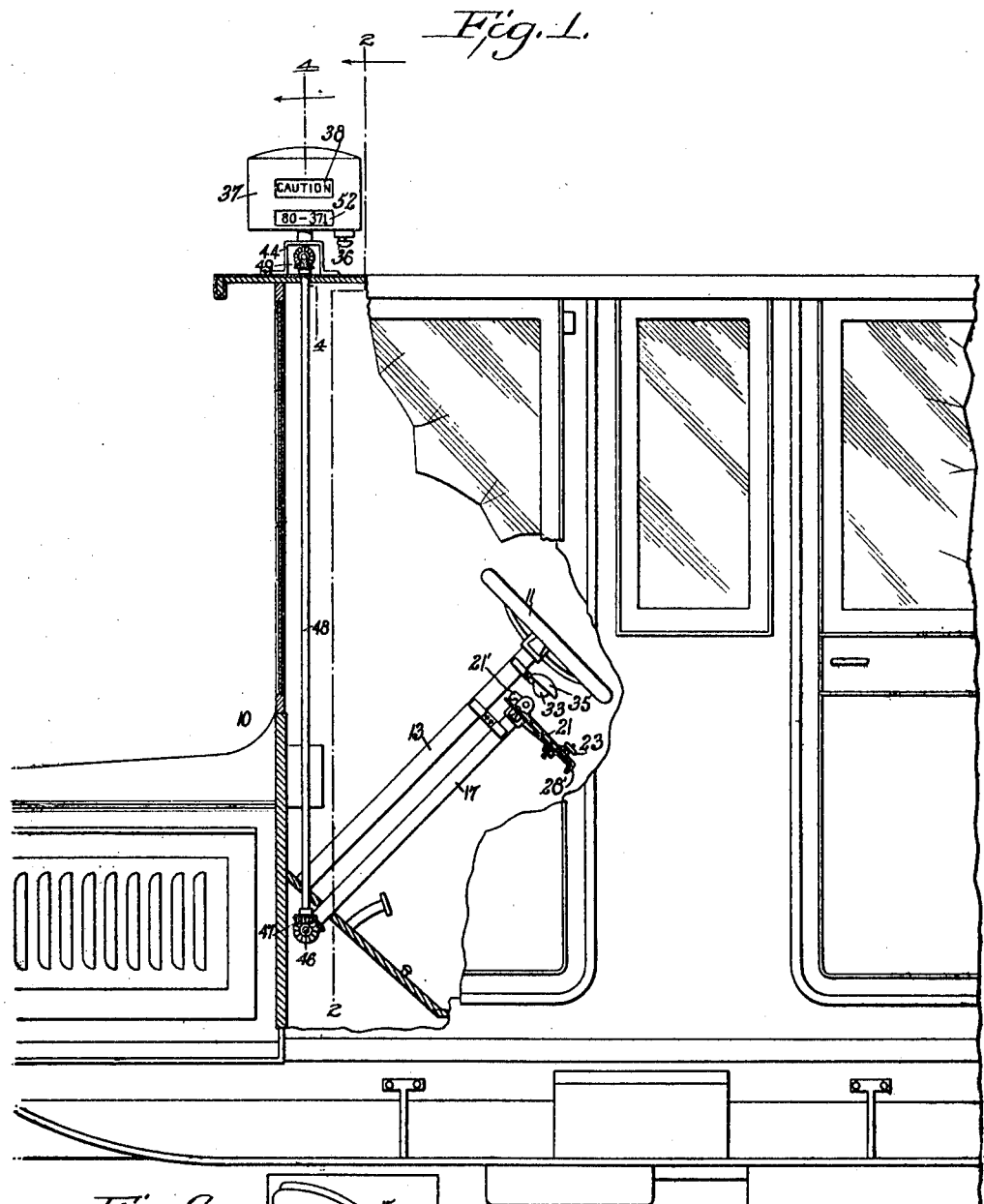
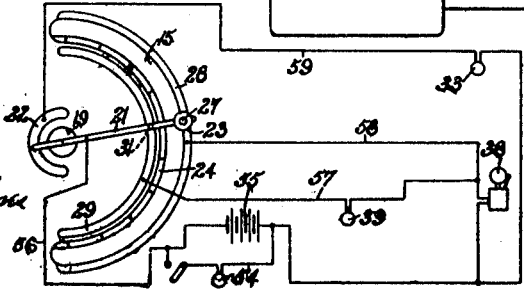

E. G. BALCH.
AUTOMOBILE SIGNAL.
APPLICATION FILED NOV. 28, 1917.
1,314,730.
Patented Sept. 2, 1919.
3 SHEETS—SHEET 2.
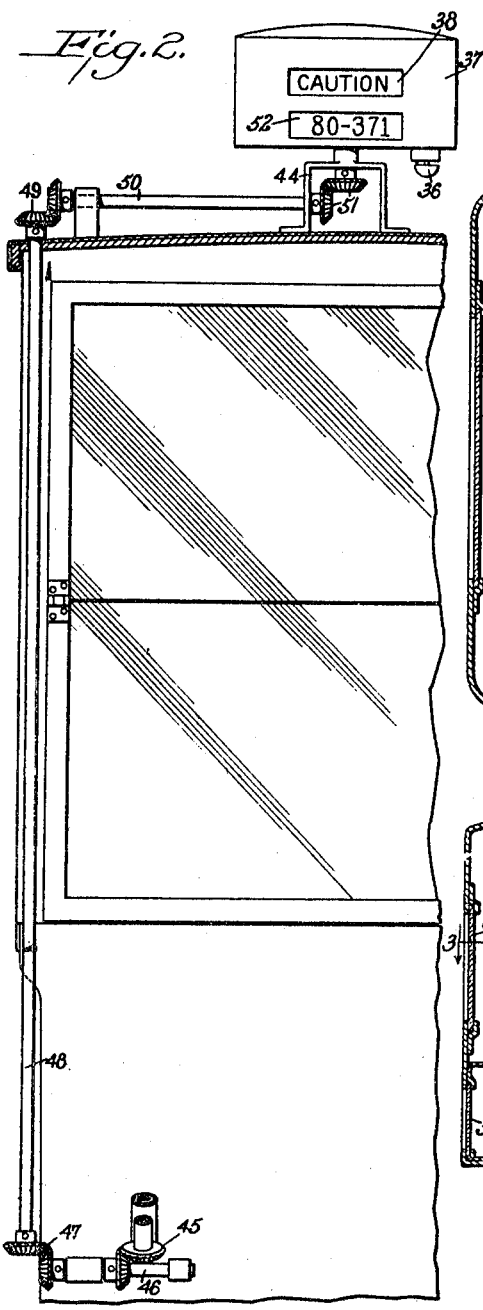
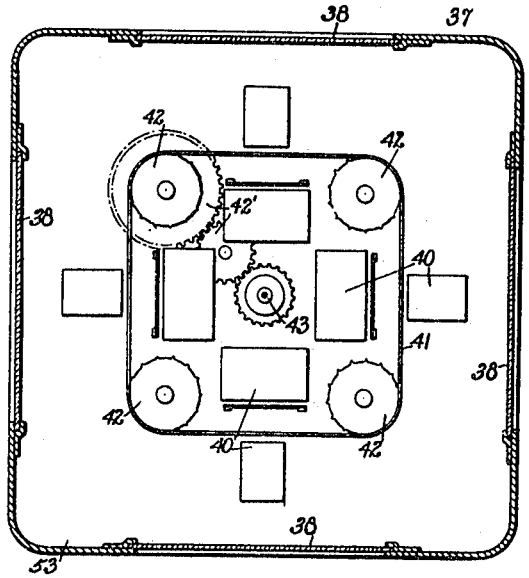
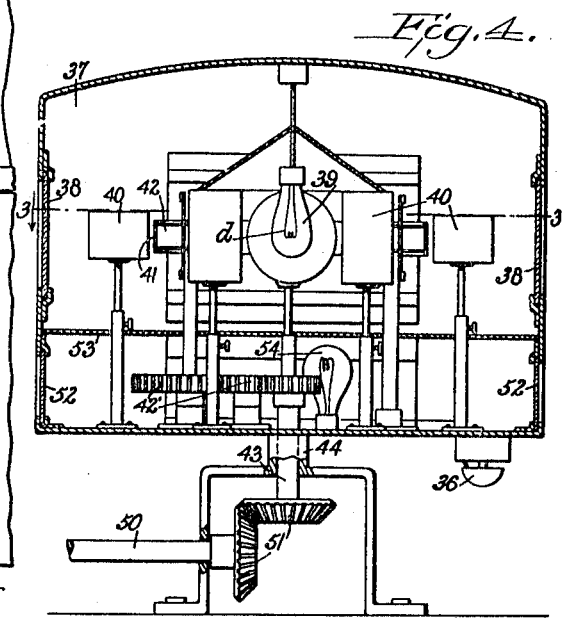
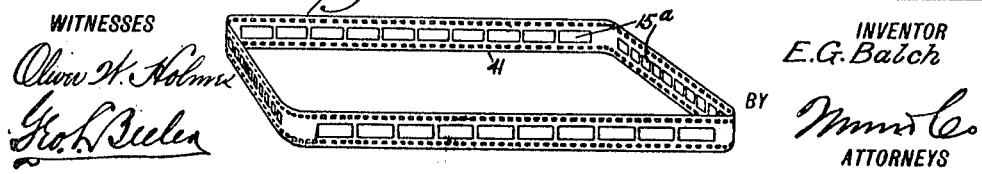
WITNESSES
INVENTOR
E. G. Balch
BY
ATTORNEYS

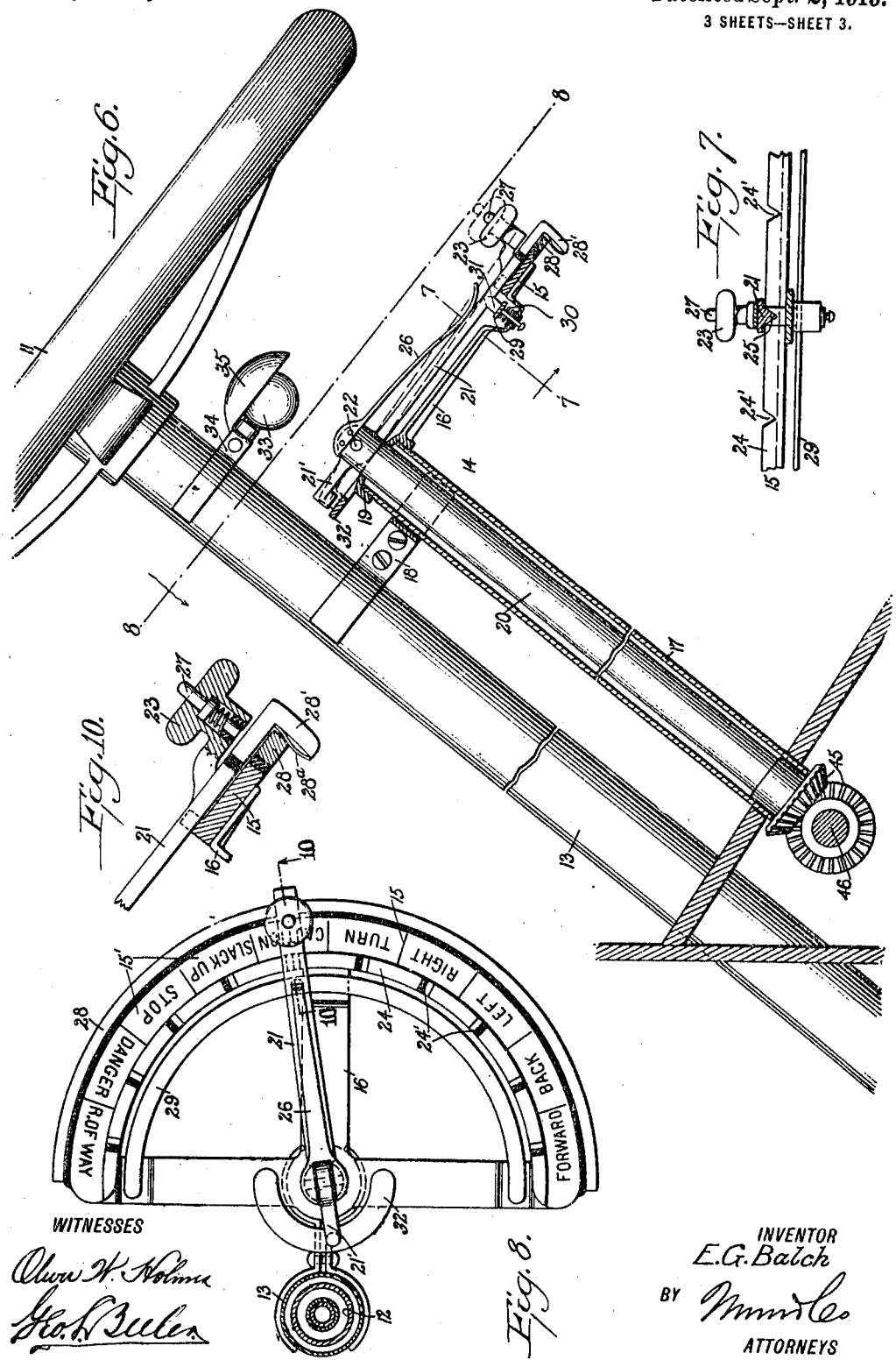

UNITED STATES PATENT OFFICE.

EBEN G. BALCH, OF NEWBURYPORT, MASSACHUSETTS.

AUTOMOBILE-SIGNAL.

1,314,730.   Specification of Letters Patent.   Patented Sept. 2, 1919.

Application filed November 28, 1917. Serial No. 204,382.

*To all whom it may concern:*

Be it known that I, EBEN G. BALCH, a citizen of the United States, and a resident of Newburyport, in the county of Essex and State of Massachusetts, have invented a new and Improved Automobile-Signal, of which the following is a full, clear, and exact description.

This invention relates to signaling systems and has particular reference to devices adapted to be used upon or in connection with automobiles, cars, marine or aerial carriers, or other vehicles.

Among the objects of the invention is to provide a signaling system for vehicles, and for convenience I will refer hereinafter to automobiles as typifying any of the various vehicles with which my improvement may be employed. I wish it to be understood, therefore, that with respect to such immaterial features I do not propose to be unnecessarily restricted. The primary object of the invention is to provide both a visible and audible signal or alarm device for the purpose of apprising the public or persons other than those on or in the vehicle as to the intention of the driver of the vehicle carrying the signal mechanisms, and furthermore to so position and exhibit or announce the signals that the same may be observed from any angle with respect to the vehicle, and at any reasonable distance therefrom.

More specifically, my invention contemplates the provision of a signal casing so located and constructed, as for example at the top of the automobile, that it may be plainly observed at all times and from either the front, rear, or either side of the machine.

A further object of the invention is to so locate the signaling devices as to insure that there shall be no obstruction, under ordinary circumstances, tending to obscure the same from the senses of the public as is so likely to be experienced with the now known devices.

A still further object of my improvement is to provide a simple and reliable means for publishing to the public any one of a considerable number of legends indicative of as many different and various purposes of the driver of the car, and yet while there are a great many of these legends that may be displayed in succession or consecutively, I still provide for the display simultaneously of the same legend in a multiplicity of different directions.

A still further object of the invention is to provide improved controlling devices for the various signals that may be employed in my system of such a character and so located that I can produce any one of a great many different signal effects in a most convenient and reliable manner. With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation of a fragment of an automobile indicating a suggestion of a suitable location for my improved signal casing and the relation thereto of the steering and controlling devices for the machine and the signals.

Fig. 2 is a vertical transverse sectional detail substantially on the line 2—2 of Fig. 1.

Fig. 3 is a horizontal section on the line 3—3 of Fig. 4.

Fig. 4 is a vertical sectional detail on the line 4—4 of Fig. 1.

Fig. 5 is a detail view of a diagram of the indicia strip.

Fig. 6 is an enlarged side elevation of the steering wheel and indicating in vertical section portions of the adjacent signal controller.

Fig. 7 is a transverse sectional detail on the line 7—7 of Fig. 6.

Fig. 8 is a plan view of the controller, parts being in section on the line 8—8 of Fig. 6.

Fig. 9 is a diagram of the system with respect to the electrical features; and

Fig. 10 is an enlarged sectional detail on the line 10—10 of Fig. 8 indicating the contact devices for the auxiliary annunciator means for ringing the bell.

Referring now more particularly to the drawings for a specific understanding of the structure I show at 10 an automobile of any suitable or improved construction with which *per se* I am not particularly concerned in this instance. I show, however, a conventional form of steering wheel 11 connected to the upper end of a steering post 12 supported in a housing 13 within convenient reach of the driver as usual.

The controller devices as a whole under the immediate grasp of the driver are indicated at 14 and located just back of and below the steering devices. By the term "controller" as used herein I mean to refer particularly to these devices adjacent to the steering mechanism.

Referring now to Figs. 6, 7 and 8 I will describe in detail a preferred embodiment of the controller devices. 15 indicates an arc-shaped legend plate supported through a bracket 16 upon the upper end of a tubular post or sleeve 17 supported in any convenient manner adjacent to the housing 13 as by means including a bracket 18 connected to said housing. The hub portion 19 of the bracket 16 is provided with a central hole constituting a bearing for a rock shaft 20 to the upper end of which is pivoted a controller lever 21, the axis of the pivot 22 being transverse or perpendicular to the axis of the shaft 20. This lever 21 has a longer arm projecting toward the operator or rearwardly from the shaft 20, and a shorter arm 21' extending in the other direction from the pivot. To the rear end of the lever 21 is connected a knob 23 or other convenient handle for manipulation thereof around either the axis of the pivot 22 or in another direction around the axis of the rock shaft 20. In other words the longer end of the lever 21 is movable up and down away from or toward the plate 15 and when moved away from the plate is free to be swung circumferentially with the shaft 20 around the axis of the shaft through any desired angle for the purpose of making operative any signal corresponding to a series of selective legends on said plate and indicated at 15'. The plate 15 is provided preferably with an upstanding flange 24 having a series of notches 24', one notch for each legend 15'. Those portions of the flange 24 between adjacent notches may be regarded as dead points upon which the controller lever 21 is adapted to rest when the signal devices are idle. The under side, however, of the lever 21 is provided with a projection or tooth 25 adapted to drop into any one of the notches 24' when the lever is brought thereover and released. This action of the lever is insured by virtue of a strong leaf spring 26, or its equivalent, indicated in this instance as secured at one end to the upper end of the rock shaft 20. The spring, therefore, is adapted to swing laterally around the axis of the shaft 20 and so always be in position with its free end bearing upon the upper face of the lever 21.

The knob 23 may be provided with and constitute a housing for an annunciator button 27, within convenient reach of the driver of the car at any time for the purpose of making electrical contact with an arc-shaped contact plate 28 shown as secured upon or adjacent to the outer edge of the plate 15 and hence concentric with said plate 15 so that irrespective of the position of the lever the depression of the annunciator will effect the completion of a circuit, soon to be described, through the plate 28. As one means for insuring the constant coöperation between the lever 21 and the contact strip 28, I provide a nose piece 28' carried by but insulated from the main portion of the lever and having a spring 28ᵃ in constant contact with the strip 28 so that even though the lever be lifted free from the rim 24 of the plate 15 the operator still by depressing the annunciator button may complete a circuit from the lever through the nose piece and strip 28.

At any convenient place, as for example between the plate 15 and the center of its curvature and hence concentric therewith, I provide another contact plate 29. This contact plate may be supported resiliently as by means of springs 30 upon the several arms of the bracket 16, but is otherwise stationary. A lug or extension 31 on the lower face of the lever 21 is adapted to engage directly against the upper face of the plate 29 when, and only when, the tooth 25 of said lever drops into a notch 24'.

A third contact strip or plate is indicated at 32 in front of the upper end of the rock shaft 20 and below the heel portion 21' of the lever, but normally spaced therefrom. This plate 32 is of a relatively short radius concentric with the rock shaft, and hence lies always beneath the free end of said short arm 21' irrespective of the lateral swinging movement of the lever 21. Whereas the lever 21 is given a substantial vertical movement around the axis of the pivot 22 to make or break contact between the lever and the plate 29, it is to be noted that the space between the heel portion, the shorter arm 21' of the lever, and the small arc-shaped plate 32 is relatively greater as to angular displacement so that the lever will not make contact with the plate 32 unless the lever is swung upwardly away from the plate 15 against the force of the spring 26.

At any convenient place I provide a lamp 33 indicated herein as supported upon a fixed bracket 34 upon the housing 13 between the wheel and the controller. This lamp is provided with a shield and reflector 35 and is calculated for the purpose of illuminating the indicia plate 15. This lamp may be kept burning constantly, but preferably I arrange it only in circuit with the plate 32 so that the lamp will glow only when the circuit is completed from the plate 32 when the lever is lifted against the force of the spring 26.

Thus far I have referred specifically only to visible signals, but I desire to employ also an audible signal such as a bell which may be located at any convenient or desired place, shown in this instance as located at 36 on the lower portion of the main signal casing 37 located preferably on the top of the automobile body or other convenient place where a view thereof from any direction will not be obstructed.

The reader's attention is now called especially to the signal casing 37. As to the specific construction of the casing, *per se*, as to size, form, material, or manner of assemblage, I am not particularly concerned in this instance, suffice it to say, however, that it is provided with a plurality of visible faces shown herein as four in number and each having a plate 38 which may be of any suitable translucent or transparent material and large enough to display any desired legend for the purposes of my invention. In the center of the casing I provide a lamp 39 constituting a source of illumination for all of the plates 38. Between the lamp 39 and each plate 38 is supported in any suitable manner a light intensifying or projecting device such as a stereopticon and indicated diagrammatically at 40 and having a structure such that even though the lamp 39 be of a moderate strength, ample illumination is assured for the signal. 41 indicates an endless flexible belt or strip, such for example as the same character as a common motion picture film and bearing as many series or groups of indicia 15$^a$ as there are windows 38, each group of indicia 15$^a$ corresponding in number and order to the legends 15' on the plate 15. Furthermore the four groups or series of indicia 15$^a$ are so arranged on the belt 41 that similar indicia of all of the several groups will be displayed simultaneously through all of the windows or plates 38. The belt 41 is supported for easy shifting or adjustment around the lamp 39 as upon sprocket wheels 42.

Any suitable means may be provided to mechanically or otherwise connect the rock shaft 20 with the indicia strip 41 so that the strip may be adjusted or shifted in synchronism with the shifting of the lever 21 around the axis of the rock shaft, or in other words so that when the tooth 25 is brought into any selected notch corresponding to the legend 15' to indicate the driver's purpose the corresponding indicia on the belt will all be located between the lamp 39 and the several windows 38. As a practical suggestion of such connections I indicate a system of rock shafts and miter gears between the rock shaft 20 and a shaft 43 journaled in the center of a bearing support 44 for the casing 37. These several parts are indicated as follows: miter gears 45, shaft 46, gears 47, upright shaft 48, gears 49, horizontal shaft 50, and miter gears 51 located within the supporting bracket 44. Obviously these connections may extend in any convenient direction and be provided with suitable bearing supports within the skill of an ordinary mechanic. For one or more of the sprockets 42 may be a gear connection 42' with the central shaft 43 so that the strip 41 may be promptly and reliably adjusted as a result of the swinging of the lever 21 around the axis of the rock shaft 20.

I show the casing 37 so constructed and arranged as to accommodate and display the driver's license on each of the several sides of the casing. This feature is shown especially in Figs. 2 and 4, each license plate being indicated at 52. While I claim no invention in the use or location at any particular place of the license plate, it is new and peculiarly useful in connection with my improved multiple face signal casing from the fact that the license number will always be visible from any point of view. As shown these license plates are located in the lower portion of the casing 37 between which and the previously described signal devices is located an opaque partition 53 forming a compartment in the lower portion of the casing in which there is a constantly glowing lamp 54 adapted to keep the license numbers constantly visible at night. Whether these license numbers be illuminated in the day time will depend upon the manner of forming the plates. Ordinarily however, the illumination of the plates 52 in the day time would be unnecessary, while I depend both for day and night service upon the peculiar illuminating means to display the signal legends in the upper and main portion of the casing.

I now call attention to the diagram of Fig. 9 in connection with a brief résumé of the operation of my improvement. At 55 I indicate a battery representing any suitable source of electrical energy and adapted to be carried at any convenient place on the automobile. From the battery a wire 56 leads to and through the lever 21. When the lever drops into any notch 24' the lug 31 of the lever engages the contact plate 29 from which a wire 57 leads to and through the signal lamp 39 back to the battery. While the lever 21 is constantly at a dead point between the notches 24' and whenever the driver desires to sound the audible alarm 36 he depresses the annunciator button 27 making contact with the plate 28 from which a wire 58 leads to and through the bell 36 back to the battery. In the practice of my invention it is obvious that the audible alarm 36 may be caused to sound automatically either alone as just described from the annunciator button 27, or in connection with either of the lamps 33 or 39, but I indicate herein the bell located so as to be in circuit with the lamp 39 whereby it will always sound while the lamp 39 is displaying the driver's intent signal. In this adaptation the sounding of the bell will be a constant reminder to the driver to restore the lever 21 to a dead point after such intent has been accomplished.

As indicated the purpose of the contact plate 32 is to provide for an illumination of the dial 15 through the lamp 33 to enable the driver to locate the proper legend of said dial. The wire 59 leads from the plate 32 through the lamp 33, around to the battery. Obviously after the desired intent mentioned is located and the lever 21 drops with the tooth 25 thereof into the selected notch 24' the circuit is automatically broken at the plate 32 and the lamp 33 is extinguished.

I claim:

1. In an automobile signal, the combination of a casing adapted to be positioned so as to be clearly visible from either the front, the rear, or either side of the vehicle, selective interchangeable indicia signal means within the casing and comprising four series of legends similarly arranged and coöperating with a like number of windows on different sides of the casing so that the same signal may be displayed simultaneously at all sides of the casing, a source of light in the center of the casing, light intensifying means between the signal means and the windows, controller means within reach of the operator for the selection of the desired signal to be displayed from all sides of the casing, and connections between the controller and the signal casing.

2. In an automobile signal, the combination of a display casing having a plurality of display sides, an endless member carrying in vertical planes a plurality of series of signal legends within the casing, the legends of all of the series being arranged in the same order, means under the control of the operator to move the legend carrying endless member in horizontal directions so as to position similar legends of all of the series simultaneously in a position to be displayed through the several sides of the casing, and means within the casing to project and magnify the legends thus positioned.

3. In an automobile signal, the combination of a casing, a lamp within the casing, said casing having a plurality of sides and a display window in each side, a movable endless indicia carrying member arranged between the source of light and the several windows and having as many series of legends thereon similarly arranged as there are windows, a plurality of light intensifiers located between said lamp and the several windows, and means to adjust the legend carrying member from the outside of the casing so as to bring the several similar legends of the several series into position simultaneously to be displayed through all of the windows.

4. In an automobile signal, the combination of a signal casing having a plurality of display sides and a window in each side, a source of light within the casing, an endless signal legend carrying element supported within the casing and between the source of light and the several windows, that portion of the element between the light and each window bearing a series of signal legends, the legends of each of the several series of such legends being arranged in the same order, light intensifying means between the source of light and each window coöperating with each series of legends, and means under the control of the operator outside of the casing to adjust the legend carrying element, moving each series portion thereof horizontally along a vertical plane so as to bring similar legends of the various series into display position between the light intensifying means and the several windows simultaneously.

EBEN G. BALCH.